United States Patent
Maino et al.

(10) Patent No.: US 12,196,251 B2
(45) Date of Patent: Jan. 14, 2025

(54) BEARING ASSEMBLY

(71) Applicant: Microtecnica S.r.l., Turin (IT)

(72) Inventors: Franco Maino, Brugherio (IT); Dario Molinelli, Carnate (IT); Michele Restuccia, Milan (IT)

(73) Assignee: MICROTECNICA S.R.L., Turin (IT)

( * ) Notice: Subject to any disclaimer, the term of this patent is extended or adjusted under 35 U.S.C. 154(b) by 16 days.

(21) Appl. No.: 17/972,905

(22) Filed: Oct. 25, 2022

(65) Prior Publication Data

US 2023/0417282 A1    Dec. 28, 2023

(30) Foreign Application Priority Data

Oct. 27, 2021 (EP) .................................... 21205104

(51) Int. Cl.
- *F16C 11/06* (2006.01)
- *F16C 23/04* (2006.01)
- *F16C 43/02* (2006.01)

(52) U.S. Cl.
CPC ........ *F16C 11/0614* (2013.01); *F16C 23/045* (2013.01); *F16C 43/02* (2013.01); *F16C 2226/62* (2013.01); *F16C 2326/43* (2013.01)

(58) Field of Classification Search
CPC .. F16C 11/0614; F16C 23/045; F16C 35/077; F16C 43/02; F16C 2226/62
See application file for complete search history.

(56) References Cited

U.S. PATENT DOCUMENTS

| | | | |
|---|---|---|---|
| 3,516,136 A | 6/1970 | Carter et al. | |
| 4,243,192 A | 1/1981 | Johnson | |
| 4,319,788 A * | 3/1982 | Hackman | F16C 23/045 384/210 |
| 6,612,744 B2 | 9/2003 | Sasaki et al. | |
| 9,366,296 B2 | 6/2016 | Abrudan et al. | |
| 9,885,386 B2 * | 2/2018 | Khera | F16C 23/04 |
| 9,951,808 B2 | 4/2018 | Romano et al. | |
| 9,958,013 B2 | 5/2018 | Hervieux et al. | |
| 2015/0198204 A1 | 7/2015 | Abrudan et al. | |

FOREIGN PATENT DOCUMENTS

EP    3263933 A1    1/2018

OTHER PUBLICATIONS

European Search Report for Application No. 21205104.9, mailed May 6, 2022, 9 pages.

* cited by examiner

*Primary Examiner* — Phillip A Johnson
(74) *Attorney, Agent, or Firm* — CANTOR COLBURN LLP

(57) ABSTRACT

A bearing assembly includes a housing, an annular outer race located at least partially within the housing, a bearing located at least partially within the outer race, and a nut configured to be secured to a second axial end of the outer race. The outer race has a central axis and comprises a flange at a first axial end, wherein the flange is configured to prevent movement of the outer race relative to the housing in a first axial direction. The nut is configured to prevent movement of the outer race relative to the housing in a second axial direction, the second axial direction being opposite to the first axial direction.

11 Claims, 5 Drawing Sheets

BEARING ASSEMBLY

CROSS-REFERENCE TO RELATED APPLICATIONS

This application claims priority to European Patent Application No. 21205104.9 filed Oct. 27, 2021, the entire contents of which is incorporated herein by reference.

TECHNICAL FIELD

The present disclosure relates to a bearing assembly, in particular for use in an actuator for a helicopter main rotor, although other applications are envisaged.

BACKGROUND

FIG. 1 illustrates a side view of a main rotor 2 of a helicopter. The main rotor 2 comprises four blades 4 each connected to a hub 6 which rotates about a central axis 8. The main rotor 2 also comprises an upper swash plate 10 and a lower swash plate 12, where the upper swash plate 10 rotates relative to the lower swash plate 12 via bearings. Multiple pitch links 16 attach each blade to the upper swash plate 10, where each pitch link 16 is hinged at its top and bottom. The main rotor 2 also comprises a plurality of (for example three) actuators 18 attached to the lower swash plate 12, wherein extension or retraction of the main rotor actuators 18 causes the lower swash plate 12 to be moved up or down (or tilted) relative to a helicopter main body 20, thereby allowing the pilot to steer the helicopter. The main rotor actuators 18 are typically in the form of linear actuators and are pivotally attached to the lower swash plate 12 via bearing assemblies 24. The main rotor actuators 18 are also pivotally attached to the helicopter main body 20 via bearing assemblies 24.

FIG. 2 illustrates a linear actuator 18 for use in the main rotor 2 illustrated in FIG. 1. The linear actuator 18 has a cylinder 19 and a piston 21. A bearing assembly (position roughly indicated at 24; see also FIG. 1) is located at an upper end of the piston 21 to allow the piston 21 to rotate relative to the lower swash plate 12. A bearing assembly is also disposed at a lower end of the cylinder 19 to allow the cylinder 19 to rotate relative to the main body 20.

Components of the bearing assemblies (which typically include a spherical bearing) wear over time, and will eventually require maintenance or replacement. Dismantling of the bearing assembly to provide access to the bearing for maintenance typically requires a hydraulic press, chamfer tool, or other specialised equipment. This process can be time consuming and costly.

It is the object of the present invention to simplify maintenance of a bearing assembly such as that described above, by allowing the bearing to be accessed and removed more easily and using standard tools.

SUMMARY

According to an aspect the present invention provides a bearing assembly comprising a housing, an annular outer race located at least partially within the housing, the outer race having a central axis and comprising a flange at a first axial end, wherein the flange is configured to prevent movement of the outer race relative to the housing in a first axial direction, a bearing located at least partially within the outer race, and a nut configured to be secured to a second axial end of the outer race, wherein the nut is configured to prevent movement of the outer race relative to the housing in a second axial direction, the second axial direction being opposite to the first axial direction.

This arrangement allows the bearing to be more easily removed from the housing than conventional methods. The bearing assembly can be constructed and deconstructed using standard tools. The bearing assembly is therefore easier to maintain, whilst still having the necessary structural integrity for high load applications, for example when used for an actuator in a helicopter.

The bearing may be a spherical bearing. The benefits of the present disclosure are particularly apparent for these types of bearing (although others are envisaged within the broadest scope of the disclosure).

The housing may comprise an annular first slot for receiving the nut, and the nut may be configured to abut against a surface of the first slot. This provides simple and robust means for securing the nut relative to the housing.

The nut and the outer race may have complementary screw threads such that the nut may be configured to screw onto an outer surface of the outer race. The screw thread allows the nut to be tightened to a specific torque depending on requirements of the bearing assembly and the intended us, and allows the nut to be removed easily using standard tools. This provides ease of maintenance of the bearing assembly.

The housing may further comprise a second slot for receiving the flange, wherein the flange may be configured to abut against a surface of the second slot. This provides simple and robust means for fixing the outer race relative to the housing in the first axial direction, and allows ease of removal of the outer race from the housing.

The second slot and flange may both be annular. This helps to provide an even distribution of forces in the bearing assembly, and thereby helps to provide stability of the bearing assembly in use. It also helps to provide a robust system and reduces the chance of the flange from breaking, for example.

The second slot may be positioned on an opposite side of the housing to the first slot. This provides symmetry of forces in the bearing assembly and allows the flange and nut to work together optimally to secure the outer race relative to the housing.

The outer race may be a generally cylindrical piece that defines the central axis, wherein the first and second axial directions may extend parallel to the central axis.

The bearing assembly may further comprise a pin configured to extend through the housing, wherein the flange may comprise a notch or hole and the pin may be configured to fit into the notch or hole to prevent the outer race from rotating. This provides simple means for preventing the outer race from rotating, and is easy to remove and cheap to produce.

The bearing assembly may further comprise a pin configured to extend through the housing, wherein the nut may comprise at least one groove and the pin may be configured to fit into the groove to prevent the nut from rotating. The at least one groove in the nut may help with removal of the nut during maintenance. The combination of the at least one groove in the nut and the pin prevents the nut from rotating during use.

The bearing assembly may further comprise a cord extending through the pin and configured to be secured to the housing to prevent the pin from moving. The cord is easy to secure and remove, and cheap to produce.

According to a further aspect, the present invention provides a method of constructing the bearing assembly of any preceding claim, the method comprising inserting the outer race into the housing until the flange abuts a surface of the housing, and attaching the nut to the outer race to secure the nut relative to the housing. This is a convenient method of constructing the bearing assembly which does not require specialist tools.

The attaching step may include threading the outer race onto the nut until a pre-determined torque is achieve. This step is easy to achieve using standard tools, and the torque can be adjusted depending on the intended use of the bearing assembly.

The method may further comprise arranging the outer race so that a or the notch or hole of the flange is aligned with a or the passage of the housing for receiving a or the pin. This allows a pin to be inserted, to prevent the outer race from rotating during use.

The method may further comprise twisting the nut after the attaching step so that a or the groove of the nut is aligned with a or the passage of the housing for receiving a or the pin. This allows a pin to be inserted, to prevent the nut from rotating during use.

The method may further comprise inserting a or the pin through the housing after the inserting and attaching steps. The pin provides simple means for preventing the outer race and the nut from rotating during use, and is easy to remove during maintenance.

The method may further comprise inserting a cord through the pin and securing the cord to the housing. This prevents the pin from moving during use.

DETAILED DESCRIPTION

Figure 1:
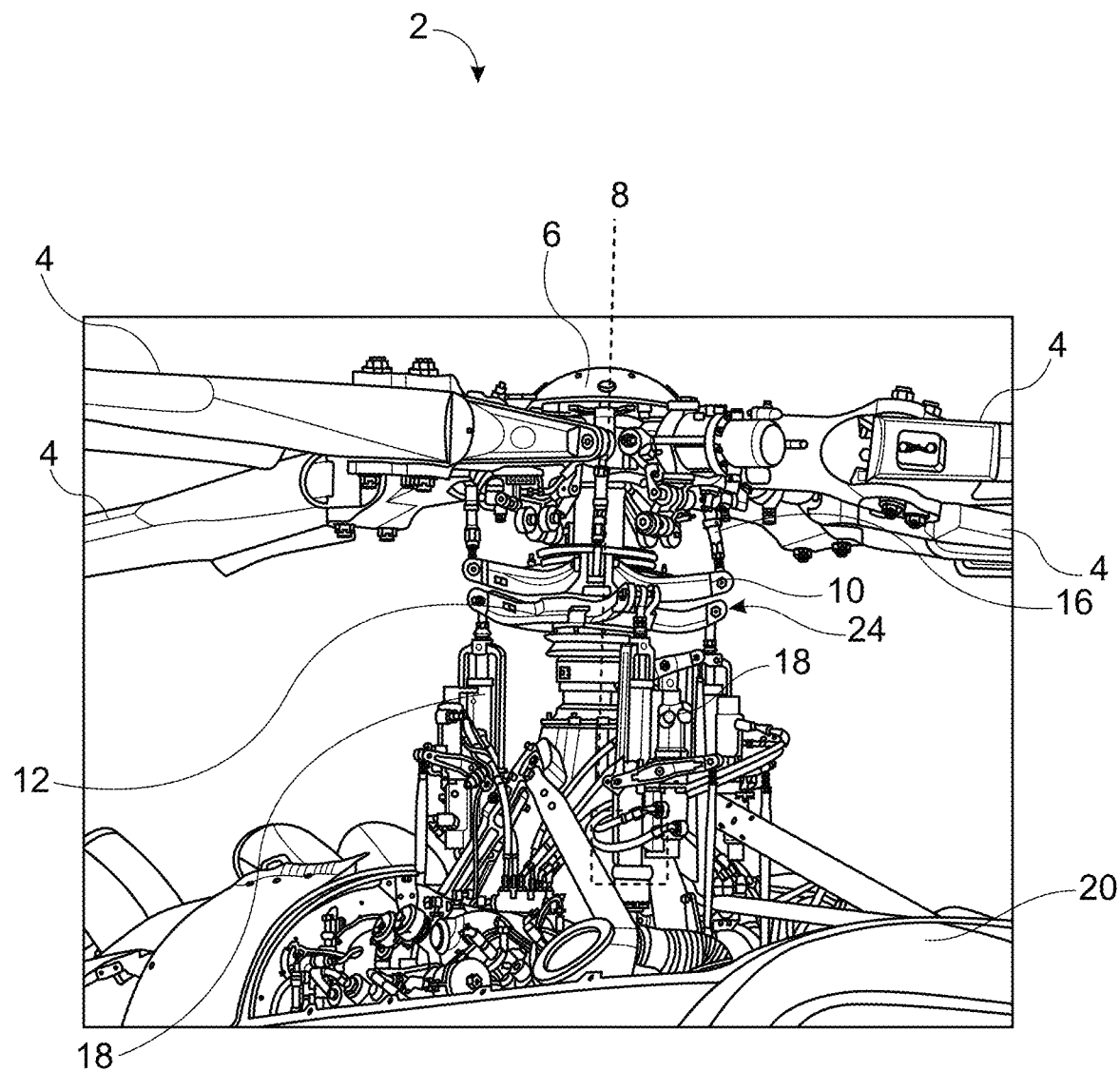
FIG. 1 illustrates a side view of a main rotor of a helicopter.
Figure 3:
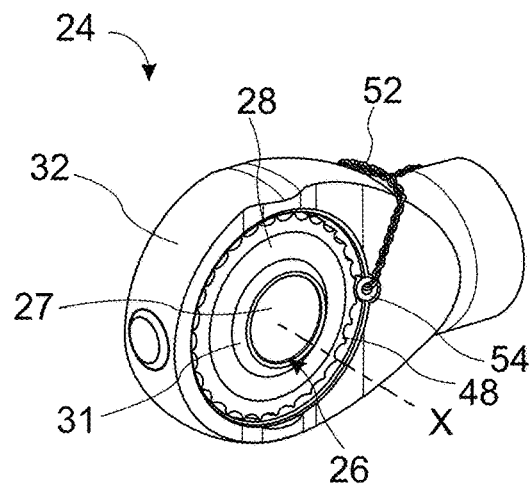
FIG. 3 illustrates a side view of a bearing assembly.

FIG. 3 illustrates a side view of a bearing assembly 24 according to the disclosure, and will be described for illustrative purposes in the context of the main rotor 2 of a helicopter as illustrated in FIG. 1. However, it should be understood that the bearing assembly of the present disclosure can be applied to other locations within the helicopter. For example, the bearing assembly may be located at the bottom, rather than top, of a linear actuator. The bearing assembly described herein is also not limited to use in a helicopter and may be applicable to other systems, and is not necessarily limited to use with linear actuators, for example.

Referring back to FIG. 3, the bearing assembly 24 comprises a spherical bearing 26. The spherical bearing 26 may have a cylindrical passage 27 extending through it to allow connection to a shaft or clevis of the lower swash plate 12, for example.

Figure 2:
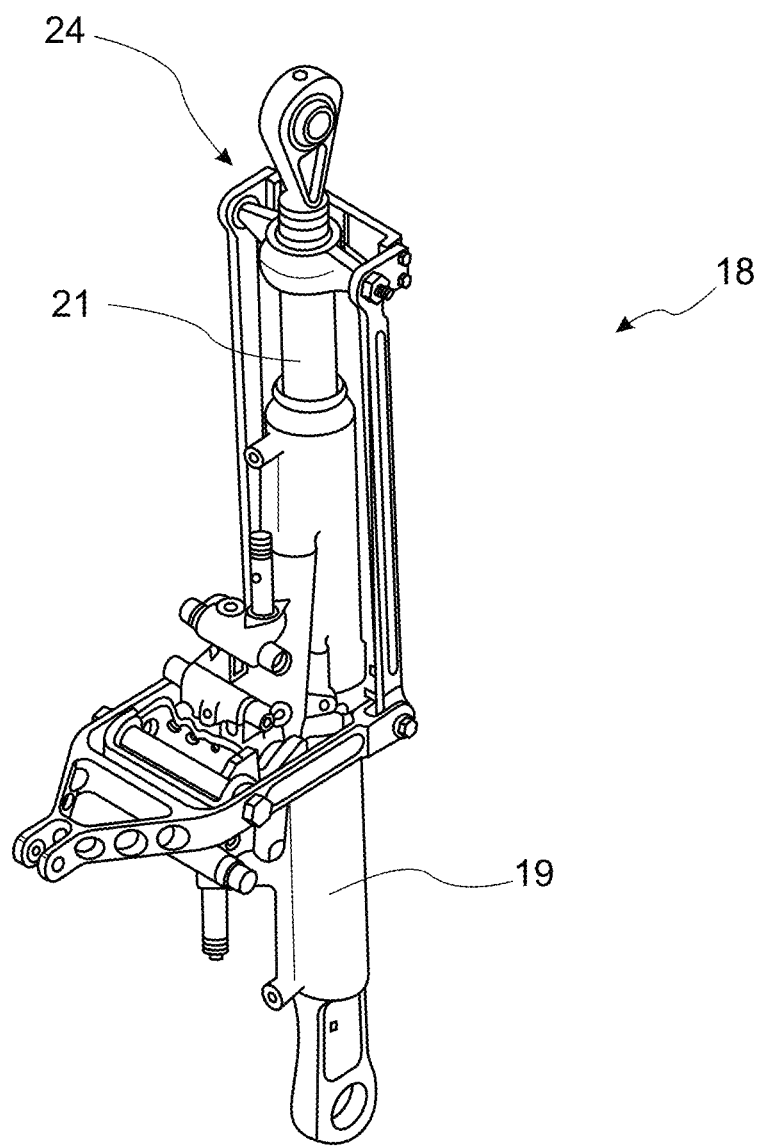
FIG. 2 illustrates an actuator for use in the main rotor of FIG. 1.

The bearing assembly 24 comprises a static housing 32 that is fitted around the spherical bearing 26. The housing 32 comprises a hollow interior defined substantially by a cylindrical surface 33 of the housing 32, and within which the spherical bearing 26 is located. The spherical bearing 26 is configured to rotate relative to the static housing 32. The static housing 32 may form part of a static device such as a linear rod (e.g., a piston 21 or cylinder 19 as illustrated in FIG. 2), and may be formed integrally therewith. In other embodiments, the static housing 32 is a separate component which is coupled to the rod (for example the piston 21 or cylinder 19).

Figure 4:
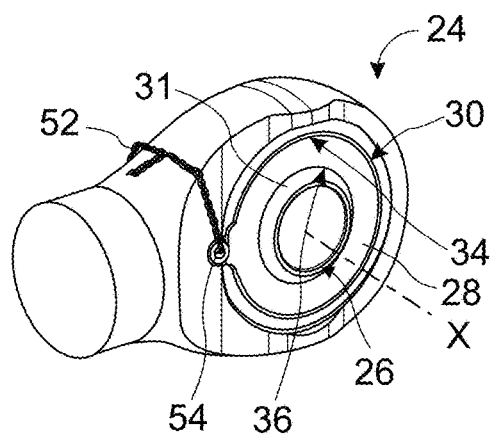
FIG. 4 illustrates an opposite side view of the bearing assembly of FIG. 3.

An outer race 28 is disposed between the spherical bearing 26 and the housing 32. As shown in FIG. 4, which illustrates an opposite side view of the bearing assembly 24 to the view shown in FIG. 3, at least part of an outer surface 30 of the outer race 28 is configured to abut against an inner surface 34 of the housing 32. The outer race 28 has a hollow interior which is configured to receive the spherical bearing 26. The hollow interior of the outer race 28 is shaped to complement an outer surface 31 of the spherical bearing 26. In this manner, an inner surface 36 of the outer race 28 is configured to slidingly contact the outer surface 31 of the spherical bearing 26 in use.

Figure 5:
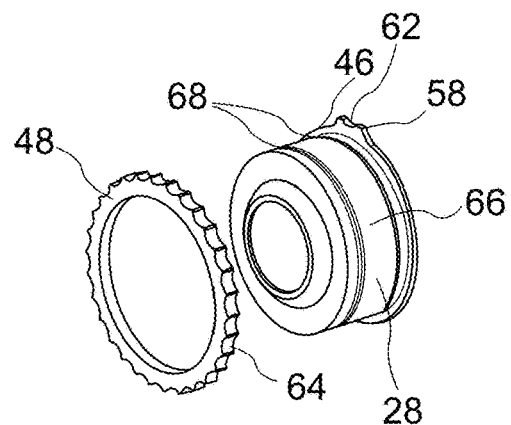
FIG. 5 illustrates an exploded view of an outer race and nut for the bearing assembly of FIGS. 3 and 4.
Figure 6:
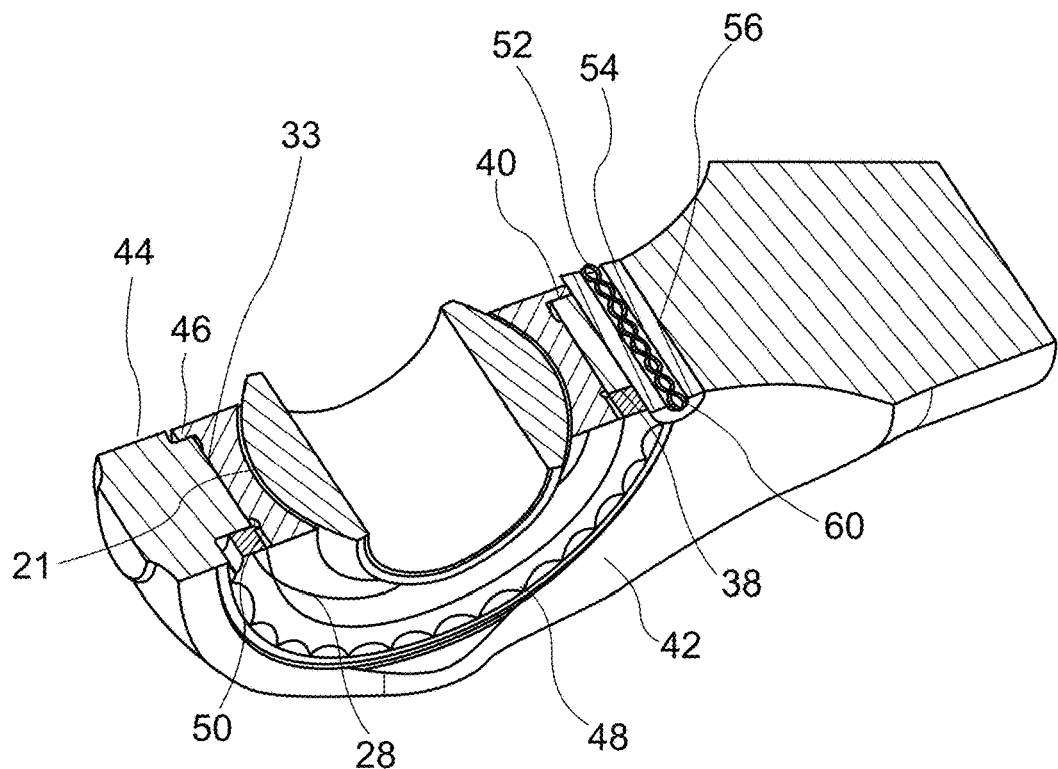
FIG. 6 illustrates a cut-out view of the bearing assembly of FIGS. 3 to 5.
Figure 7:
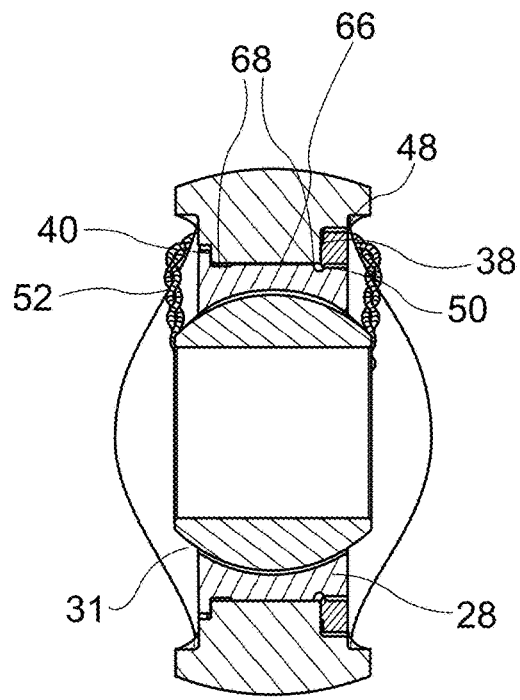
FIG. 7 illustrates a cross-section of the bearing assembly of FIGS. 3 to 6.

As best illustrated in FIGS. 5 to 7, the housing 32 has an annular slot or cut-out 38 formed in an axially facing (radially extending) surface 42 of the housing 32, and another annular slot or cut-out 40 formed in an opposite axially facing surface 44 of the housing 32. The axial/radial directions are defined relative to a central axis X of the hollow interior. Additionally, or alternatively the slots or cut-outs 38, 40 could be said to be formed in the cylindrical surface 33 of the housing 32.

The outer race 28 has a radially extending flange 46 at one end. In this embodiment, the flange 46 is a continuous annular ring. However, in other embodiments the flange may not be ring-shaped and may comprise multiple tabs, for example. A first of the annular slots 38 is shaped to receive the flange 46. The flange 46 and annular slot 38 cooperate to prevent axial movement of the outer race 28 in a first direction (i.e., axially away from the slot 38). The flange 46 is configured to abut against a radially extending surface of the slot 38 when the outer race 28 is inserted into the housing 32.

A second of the annular slots 40 is configured to receive a nut 48. The nut 48 is annular and is configured to secure to a portion of the outer surface 30 of the outer race 28. In this embodiment, the outer race 28 and nut 48 are secured to each other via complementary screw threads 50. Using complementary screw threads 50 is particularly advantageous because the nut 48 can be easily removed from the outer race 28. I In other embodiments the outer race 28 and nut 48 may be secured to each other by other methods, for example the nut 48 is press-fit onto the outer race 28. When in position, the nut 48 acts to hold the outer race 28 in place relative to the housing 32. That is, tightening the nut 48 pulls the outer race 28 in the first direction defined above, so that the flange 46 is pressed against the slot 38. The nut 48 is fitted around the outer race 28 in this manner, and into the annular slot 40. The nut 48 is configured to abut against an axially facing (radially extending) surface of the slot 40 upon tightening it. The nut 48 may be formed from any suitable material, for example corrosion resistant steel.

The bearing assembly 24 may comprise a pin 54. The pin 54 is received in a passage 56 formed axially through the housing 32. The pin 54 helps to prevent the outer race 28 from rotating by engaging with a portion 58 of the flange 46 (FIG. 5). The portion 58 of the flange 46 is shaped to engage either side of the pin 54 upon a rotational force being applied to the outer race 28. In this embodiment, the portion 58 extends radially further than the rest of the flange 46 and comprises a notch 62 which engages with the pin 54. Other portion 58 shapes (and locations) may achieve the desired effect as long as they interact to prevent rotation of the outer race 28. For example, two tabs could extend from the flange 46 to engage either side of the pin 54. In yet other embodiments, the pin 54 may extend through a hole in the flange 46 to prevent the outer race 28 from rotating. The passage 56 and pin 54 may be any suitable complementary shape, for example cylindrical.

The pin 54 may also be configured to prevent rotation of the nut 48. That is, the nut 48 may comprise multiple notches 64 formed in its radially outer edge. The nut 48 is positioned so that one of the notches 64 lines up with the pin 54, to allow the pin 54 to engage with the notch 64. This helps to prevent the nut 48 from rotating.

Accordingly, the pin 54 prevents rotation of the outer race 28 and nut 48. Small rotations of these components relative to the housing 32 may cause undesired wear of components of the bearing assembly 24, and the pin 54 prevents these rotations. The pin 54 is easy to install and is cheap to produce, and (as explained above) is easy to remove from the housing 32.

Figure 8:
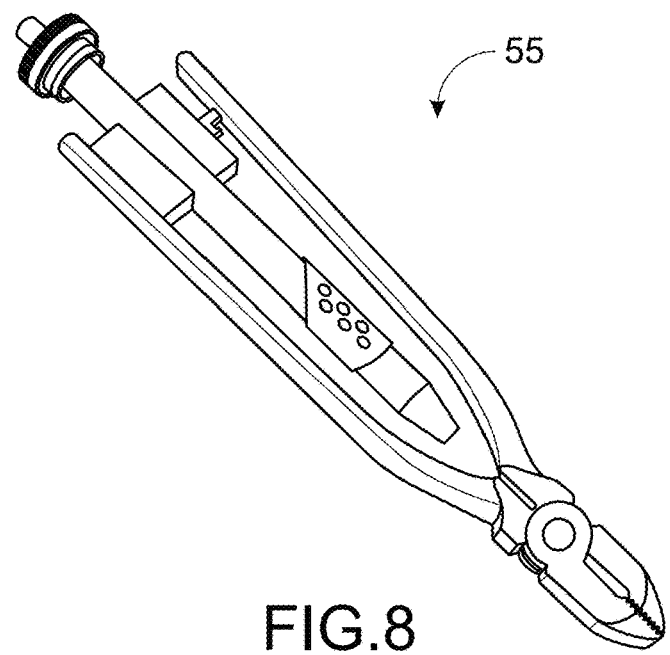
FIG. 8 illustrates a tool for clamping a cord of the bearing assembly of FIGS. 3 to 7.

The bearing assembly 24 may further comprise a cord 52 to further secure the various components of the bearing assembly 24 together. In this embodiment, the pin 54 is hollow and has a passage 60 extending along its centre, and the cord 52 is received through the passage 60. The cord 52 is then configured to wrap around the housing 32 and its end secured (e.g., together). The cord 52 may be secured by placing the ends under tension and clamping them together using a suitable tool. An example of such a tool 55 is illustrated in FIG. 8 When wrapped and secured, the cord 52 prevents the pin 54 from moving relative to the housing 32. The cord 52 may be formed from any suitable material, for example metal wire, and in the illustrated example a pair of metal wires twisted together. The cord 52 is advantageous because it is able to secure the assembly whilst being easy to remove when dismantling it. Additionally, or alternatively the pin 54 may be press-fit or adhesively bonded into the passage 56 of the housing 32.

The bearing assembly 24 may also comprise sealant applied over outer surfaces of the bearing assembly 24. In particular, the sealant may be advantageously placed over gaps in the bearing assembly 24, for example applied on one or both of the axial ends of the bearing assembly 24 over one or more gaps between the outer race 28 and housing 32, the nut and the housing 32, and the nut 48 and the outer race 28. This can help to prevent corrosion and contamination of the bearing assembly 24.

A radially outer surface 66 of the outer race 28 may have at least one groove 68, for example two grooves 68. As shown in FIG. 7, the inner surface 34 of the housing 32 does not contact the outer race 28 where the grooves 68 are located. The grooves 68 are dimensioned to allow the portion of the outer race 28 in contact with the inner surface 34 to be centrally located and symmetrical relative to the centre of the spherical bearing 26. This helps to provide a symmetrical and even distribution of forces in the bearing assembly 24. Uneven force distribution in the bearing assembly 24 can lead to instability and wear within the bearing assembly 24 and the at least one groove 68 can help to prevent this. The grooves 68 are advantageous but not essential for the broadest aspects of the present disclosure.

In use, it may be necessary to deconstruct or disassemble the bearing assembly 24 to allow access to components of the bearing assembly 24, for example the spherical bearing 26, for maintenance. A method of deconstruction of the bearing assembly 24 will now be described.

The cord 52 (if present) is removed from the bearing assembly 24 by any suitable method, for example the cord 52 is cut or untied from the housing 32. The pin 54 can then be pulled out of the passage 56.

Figure 9:
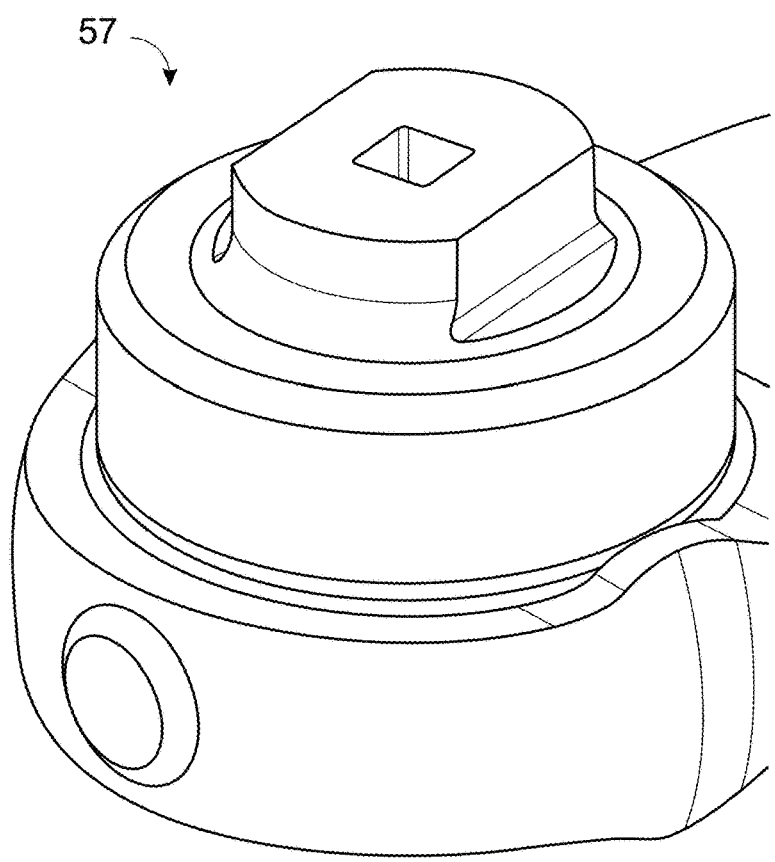
FIG. 9 illustrates a tool for removing a nut of the bearing assembly of FIGS. 3 to 8.

The nut 48 is then removed from the bearing assembly 24. If a screw thread 50 is used to secure the nut 48 to the outer race 28, the nut 48 is twisted relative to the outer race 28 to remove it. This can be achieved using any suitable tool. An example of such a tool 57 is illustrated in FIG. 9. The tool 57 comprises a socket wrench with an internal shape that matches the shape of the nut 48.

The outer race 28 is now free to be removed from within the housing 32 from the side of the outer race 28 with the flange 46. Once the outer race 28 is removed from the housing 32, the spherical bearing 26 can be removed from within the outer race 28 if necessary, by any suitable method.

A method of construction (or re-assembly) of the bearing assembly 24 will now be described.

The outer race 28 is first placed into the hollow interior of the housing 32 until the flange 46 abuts against the slot 40. The outer race 28 is arranged so that the notch 60 is aligned with the passage 56.

The nut 48 is then threaded onto the outer race 28 until a pre-determined torque is achieved. The nut 48 is then further twisted/positioned a small amount so that a notch 64 of the nut 48 is aligned with the passage 56. Due to the use of multiple notches 64 this further extension does not significantly affect the pre-determined torque (it will not overtighten the nut 48).

The pin 54 is inserted into the passage 56 to engage with the notches 60, 64. The pin 54 may instead be partially inserted into the passage 56 before the nut 48 is fit onto the outer race 28, and then inserted fully after the nut 48 has been fit.

The pin 54 may then be secured to the housing 32 by adhesive, if using.

The cord 52 is threaded into the passage 62 in the pin 53 and wrapped round a portion of the housing 32. The ends of the cord 52 are then clamped together using any suitable tool to provide the desired tension of the cord 52 and secure the cord 52 in place.

If using, sealant is then applied over gaps on the bearing assembly 24 to help prevent corrosion/contamination in the bearing assembly 24.

The arrangement of this disclosure allows the spherical bearing 26 to be more easily removed from the housing 32 than conventional methods. The bearing assembly 24 can be constructed and deconstructed using standard tools. The bearing assembly 24 is therefore easier to maintain, whilst still having the necessary structural integrity for high load applications, for example when used for an actuator in a helicopter.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A bearing assembly comprising:
   a housing;
   an annular outer race located at least partially within the housing, the outer race having:
      a central axis and comprising:
         a flange at a first axial end, wherein the flange is configured to prevent movement of the outer race relative to the housing in a first axial direction;
   a bearing located at least partially within the outer race;
   a nut configured to be secured to a second axial end of the outer race, wherein the nut is configured to prevent movement of the outer race relative to the housing in a second axial direction, the second axial direction being opposite to the first axial direction, wherein the housing comprises an annular first slot for receiving the nut, and the nut is configured to abut against a surface of the first slot, wherein the nut comprises at least one notch; and
   a pin configured to extend through the housing, wherein the flange comprises a notch or hole and the pin is configured to fit into the notch or hole to prevent the outer race from rotating, and wherein the pin is configured to fit into the at least one notch of the nut to prevent the nut from rotating.

2. The bearing assembly of claim 1, wherein the bearing is a spherical bearing.

3. The bearing assembly of claim 1, wherein the nut and the outer race have complementary screw threads such that the nut is configured to screw onto an outer surface of the outer race.

4. The bearing assembly of claim 1, wherein the housing further comprises:
   a second slot for receiving the flange, wherein the flange is configured to abut against a surface of the second slot.

5. The bearing assembly of claim 4, wherein the second slot and flange are both annular and/or the second slot is positioned on an opposite side of the housing to the first slot.

6. The bearing assembly of claim 1, wherein the outer race is a generally cylindrical piece that defines the central axis, and the first and second axial directions extend parallel to the central axis.

7. The bearing assembly of claim 1, further comprising:
   a cord extending through the pin and configured to be secured to the housing to prevent the pin from moving.

8. A method of constructing the bearing assembly of claim 1, the method comprising:
   inserting the outer race into the housing until the flange abuts a surface of the housing; and
   attaching the nut to the outer race to secure the nut relative to the housing;
   arranging the outer race so that the notch or hole of the flange is aligned with a the passage of the housing for receiving the pin; and
   inserting the pin through the housing after the inserting the outer race and attaching steps.

9. The method of claim 8, further comprising:
   twisting the nut after the attaching step so that a or the groove of the nut is aligned with a or the passage of the housing for receiving a or the pin.

10. The method of claim 8, further comprising:
   inserting a cord through the pin and securing the cord to the housing.

11. A bearing assembly comprising:
   a housing;
   an annular outer race located at least partially within the housing, the outer race having:
      a central axis and comprising:
         a flange at a first axial end, wherein the flange is configured to prevent movement of the outer race relative to the housing in a first axial direction;
   a bearing located at least partially within the outer race;
   a nut configured to be secured to a second axial end of the outer race, wherein the nut is configured to prevent movement of the outer race relative to the housing in a second axial direction, the second axial direction being opposite to the first axial direction;
   a pin configured to extend through the housing, wherein the flange comprises a notch or hole and the pin is configured to fit into the notch or hole to prevent the outer race from rotating; and
   a cord extending through the pin and configured to be secured to the housing to prevent the pin from moving.

* * * * *